(12) United States Patent
Beckwith et al.

(10) Patent No.: US 12,713,205 B2
(45) Date of Patent: Aug. 18, 2026

(54) EMERGENCY CALL LOCATION ACCURACY TESTING

(71) Applicant: DISH Wireless L.L.C., Littleton, CO (US)

(72) Inventors: William Beckwith, Washington, DC (US); Darci O'Hearn, Littleton, CO (US); Mehdi Alasti, Arlington, VA (US)

(73) Assignee: DISH Wireless L.L.C., Littleton, CO (US)

( * ) Notice: Subject to any disclaimer, the term of this patent is extended or adjusted under 35 U.S.C. 154(b) by 315 days.

(21) Appl. No.: 18/343,217

(22) Filed: Jun. 28, 2023

(65) Prior Publication Data

US 2025/0008300 A1 Jan. 2, 2025

(51) Int. Cl.
*H04W 4/029* (2018.01)

(52) U.S. Cl.
CPC .................................. *H04W 4/029* (2018.02)

(58) Field of Classification Search
CPC .................................................... H04W 4/029
USPC ...................................................... 455/456.1
See application file for complete search history.

(56) References Cited

U.S. PATENT DOCUMENTS 7,313,402 B1 * 12/2007 Rahman ................ H04W 4/029
455/67.14
12,082,091 B1 * 9/2024 Xiao ..................... H04W 4/029
2017/0039594 A1 * 2/2017 Shaw ................. G06Q 30/0261
2019/0253861 A1 * 8/2019 Horelik ............... H04W 64/006
2020/0135005 A1 * 4/2020 Katz .................. H04M 7/0021
2021/0058508 A1 * 2/2021 Leavitt .................. H04M 3/242

FOREIGN PATENT DOCUMENTS

JP 2007098567 A * 4/2007

OTHER PUBLICATIONS

JP-2007098567-A, Tanaka et al., machine translation (Year: 2007).*

* cited by examiner

*Primary Examiner* — Sam K Ahn
(74) *Attorney, Agent, or Firm* — Kilpatrick Townsend & Stockton LLP

(57) ABSTRACT

Systems and methods for improving accuracy of location information related to mobile communication are provided. In one example, a method includes: receiving communications including location information corresponding to locations where the communications are initiated by a requestor, wherein the communications include a first communication including first location information having a first level of accuracy, obtaining a first registered location based on the first location information, returning the first registered location to the requestor, receiving updated location information for the first communication from the requestor, wherein the updated location information has a second level of accuracy, comparing the first level and second level of accuracies, and in response to the second level of accuracy is higher than the first level of accuracy, registering the updated location information corresponding to the first location information.

19 Claims, 7 Drawing Sheets

EMERGENCY CALL LOCATION ACCURACY TESTING

BACKGROUND

A person in an emergency situation may request help using a user device such as a mobile phone to dial a designated emergency number like 9-1-1 or a direct access phone number for a local emergency service provider (e.g., an emergency dispatch center). This emergency call is assigned to one or more first responders by the emergency service provider. In order to dispatch emergency personnel to aid the person in the emergency situation, the emergency service provider must determine the location of the emergency. However, the location information provided by the caller or the user device may not be complete and/or not sufficiently accurate. As a result, it is challenging for emergency service providers to identify and ascertain the real-world location where the emergency arises. Further, it is very common that a person in an emergency situation does not know or is otherwise incapable of articulating their location on the emergency call. Therefore, it is desired for improving the accuracy level of the location information associated with communication in an emergency call.

SUMMARY

Various embodiments of devices, systems, methods, and non-transitory machine-readable storage medium are provided. In one example, a method includes receiving communications including location information corresponding to locations where the communications are initiated by a requestor, wherein the communications include a first communication including first location information having a first level of accuracy, obtaining, from a location information store, a first registered location based on the first location information, returning the first registered location to the requestor, receiving updated location information for the first communication from the requestor, wherein the updated location information has a second level of accuracy, comparing the first level and second level of accuracies, and in response to the second level of accuracy is higher than the first level of accuracy, registering, in the location information store, the updated location information corresponding to the first location information.

In another example, a method includes receiving a communication including location information corresponding to a location where the communication is initiated by a requestor, obtaining ground truth location information regarding the location, the ground truth location information having a level of accuracy, correlating the location information with the ground truth location information, selecting a level of accuracy for the ground truth location information, based on a pre-established standard, and registering the ground truth location information at the selected level of accuracy.

In some embodiments, a system includes one or more processors and a computer-readable storage media storing computer-executable instructions that, when executed by the one or more processors, causes the system to perform: receiving communications including location information corresponding to locations where the communications are initiated by a requestor, wherein the communications include a first communication including first location information having a first level of accuracy, obtaining, from a location information store, a first registered location based on the first location information, returning the first registered location to the requestor, receiving updated location information for the first communication from the requestor, wherein the updated location information has a second level of accuracy, comparing the first level and second level of accuracies, and in response to the second level of accuracy is higher than the first level of accuracy, registering, in the location information store, the updated location information corresponding to the first location information.

In some embodiments, a non-transitory machine-readable storage medium encoded with instructions, the instructions executable to cause one or more processors of a computerized system to perform any methods described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Overview

Figure 1:
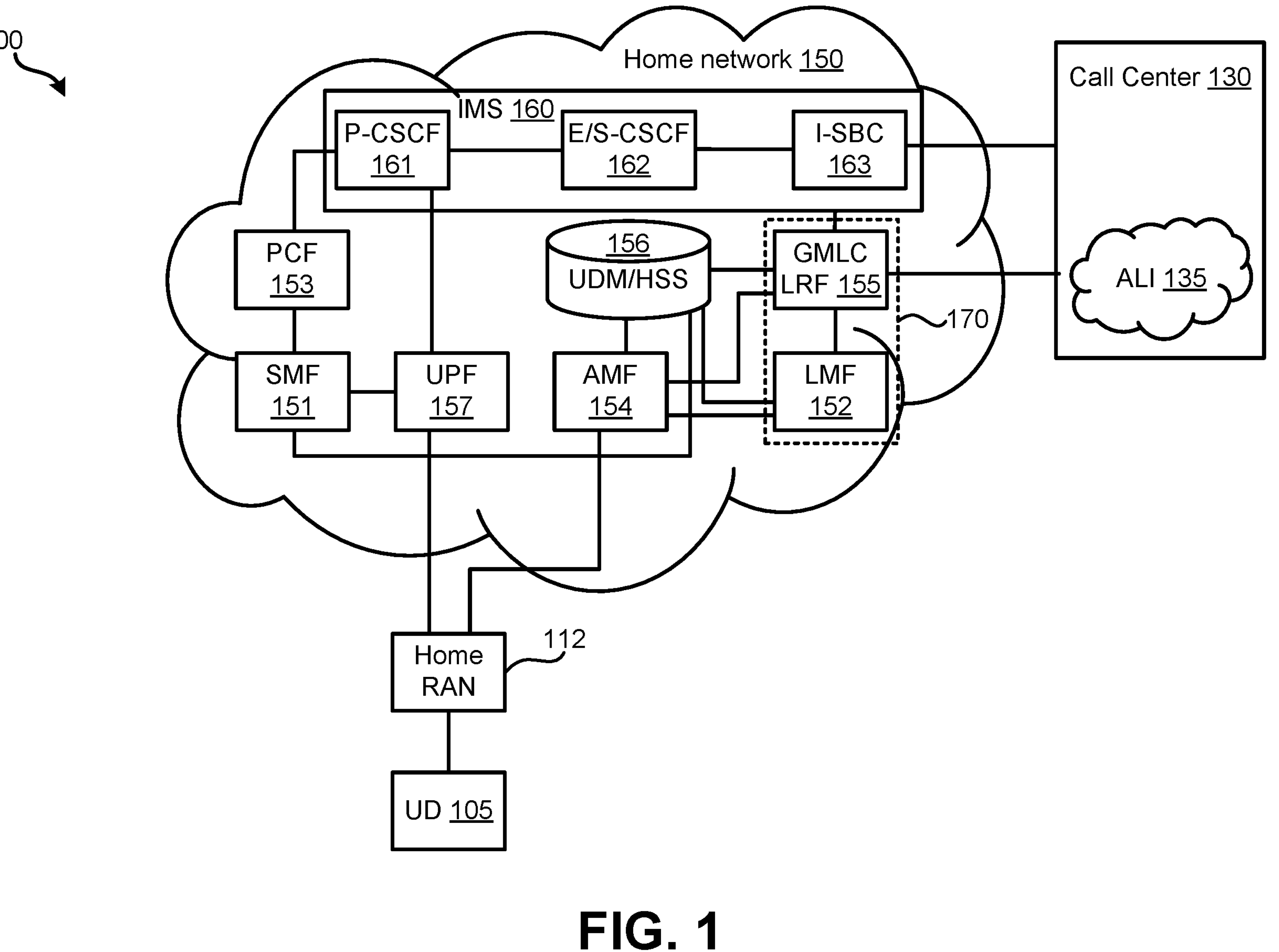
FIG. 1 is a schematic block diagram illustrating a communication system for communicating the location information regarding a user device to a call center, according to various embodiments.

Location information associated with an emergency call need be accurate so that appropriate help can be dispatched to the caller at one or more locations indicated by the location information. While location information in a relatively flat space group level can be fairly accurately obtained using existing technologies, such as the global positioning system (GPS) or cellular triangulation, it remains a challenge to accurately obtain location information for the caller when the emergency call is made in a complex structure with height differentiation, partitions, multiple stories, multiple compartments, and so on.

For example, in a building, the caller may be located in one of the rooms of the building, but the current positioning technologies may only be able to provide location accuracy as to which floor of the building the caller is located. In a large building, such as a hotel, there can be as many as hundreds of rooms on one floor, such a level of accuracy can be problematic, especially when the caller is not responsive to inquiries about his/her room number after the emergency call is initiated. For instance, the caller may initiate an emergency call in a fire situation with heavy smoke and the caller may already have lost much consciousness after the call was established. In that instance, an operator of the call center would need to rely on location information associated with the emergency call.

As another example, the caller may initiate an emergency call in a large complex at a location the caller does not know how to accurately indicate it to the operator. For instance, the caller may be new to the complex, which is partitioned with many cubicles. In that instance, if the operator can know which cubicle the caller is closest to, appropriate help may be dispatched right away to the caller.

One insight of the present disclosure is that correlation of the location information associated with a call and the ground truth location information regarding the location where the call is initiated can be established with a sufficient level of accuracy during a test or validation phase. Technicians may be dispatched to actual sites, such as buildings and complexes, to verify individual locations within the buildings and complexes. At a given location within an actual site, a technician is facilitated to initiate a test call. The location information (e.g., coordinates indicating a location-such as GPS information or Cartesian coordinates within a space) regarding the given location can be obtained, for example, by GPS or assisted GPS. The ground truth location information regarding the location (e.g., the floor number, the room number, the cubicle number, etc.) can also be perceived and obtained by the requestor at the actual site. A correlation of the ground truth location information and the location information (e.g., obtained by GPS) can be established. The correlation may have a level of accuracy that is sufficient to meet the requirements imposed by a caller center for dispatching help or a regulatory agency (e.g., Federal Communications Commission (FCC)). The ground truth information can be registered on a location database of a positioning system accessible by the call center for real-world application.

Another insight of the present disclosure is that location information associated with a call can be verified and supplemented during a test or validation phase. Technicians may be dispatched to actual sites, such as buildings and complexes, to verify individual locations within the buildings and complexes. At a given location within a site, a technician is facilitated to initiate a test call. The test call includes location information at a first accuracy level. The test call is routed to a positioning system having registered locations regarding various different sites. The positioning system is configured to obtain the location information included in the test call and obtain a registered location based on the obtained location information. The registered location information is then returned to the technician for verification/supplementation. After receiving the registered location information, the technician either verify that registered location information is accurate, or supplement the registered location information with more accurate description of the location. The technician then sends the updated location information to the positioning system so it can register the updated location information as the ground truth location information for the location where the test call was initiated by the technician.

As example, the technician is dispatched to a building and starts initiating test calls from individual rooms, for example, room No. 101, room No. 102, . . . , room No. 201, . . . room No. 210, . . . , room No. 301, . . . so on and so forth. In the individual test calls, the location information can include location information such as [X, Y] coordinates or [X, Y, Z] coordinates within a two dimensional or three dimensional space reflecting locations where the individual calls are made by the technician. For instance, the technician makes a test call at room 301, the [X, Y] coordinates or [X, Y, Z] coordinates can be sent with the test call. In some embodiments, a set of [X, Y] coordinates may be sufficient to differentiate different rooms in the same floor, and the Z coordinate is optional. In some embodiments, a set of [X, Y, Z] coordinates may more precisely reflect the location of an individual room in the building. For example, the horizontal location can be reflected by the X and Y coordinates, and the vertical location (e.g., the floor number) can be reflected by the Z coordinate of the individual room in the building.

It should be understood various positioning technologies can have different level of accuracies regarding a given location. For example, certain assisted GPS may only be able to provide location information accurate within 50 meters apart from each other. For instance, location information (e.g., the coordinates [X, Y] or [X, Y, Z]) for room 301, room 302, room 303, room 304, and room 305 on the same floor may be the same under such an assisted GPS. However, such a level of accuracy may be adequate for dispatching help to the caller, provided that only 5 rooms need be searched for the caller instead of the entire third floor of the building. It should be understood that the present disclosure provides technologies to address ground truth accuracy for locations to a level that may be actionable regardless the underlying positioning technologies are used. More accurate positioning technologies used by the technicians, of course, would render finer and more accurate registered locations for individual sites.

When the location information included in a test call is received by the positioning system. The positioning system then retrieves a registered location based on the received location information in the test call. In an initial stage, the registered location for a given individual site may be coarse. For instance, the positioning system is only able to retrieve registered location information indicating the [X, Y, Z] coordinates associated with room 301 as included in the test call is on the third floor. The positioning system sends the registered location information back to the technician (e.g., the third floor).

After receiving the registered location information, the technician verifies it and may find out that the registered location information is too coarse. The technician then updates the registered location information with the room number the technician is actually in (e.g., room 301). As mentioned above, depending on accuracy of the underlying positioning technologies for the test calls, the [X, Y, Z] coordinates may or may not be accurate enough to differentiate individual rooms. In certain situations, the technician may input different room numbers for the same the [X, Y, Z] coordinates. However, as also mentioned, such a level of accuracy may still be adequate for dispatching help.

As used herein, "location information associated with a test call or a communication from a caller," also referred to as "location information," is the location obtained by/from the user device of the caller. For example, a smart phone can provide its [X, Y, Z] coordinates obtained by GPS. Another example, a location of a cellular phone can be determined through triangulation technologies employed by communications networks (e.g., Verizon). Another example is the location information obtained by assisted GPS, from which the user device can supply reference location information along with the [X, Y, Z] coordinates in the call. For example, its relative distance with respect to a router in the building, which has a known location. This location information, as provided by the caller, may or may not be accurate in terms of being actionable. For instance, the user device may only provide a very coarse GPS-based location information corresponding to a region with a 100-meter radius. In that case, such location information may not be actionable for dispatching help to the caller. On the hand, the user device may provide very fine location information obtained through assisted GPS. For instance, the location information indicates the caller is within the 100-meter radius region and having a particular distance to a first reference point in that region, another particular distance to a second reference point, and still another particular distance to a third reference point in that region. In that case, such location information can be used to dispatch help to the caller.

As used herein, "registered location information" refers to location information registered in a location database of a positioning system. The positioning system can be provided by a communications network, or by a public entity (such as a government function). Registered location information typically includes the correlation between the geographic coordinates to the ground truth location. For example, the coordinates or a range of coordinates [(X1-Xn), (Y1-Yn), (Z1-Zn)] correspond the third floor of building A; the coordinates [X1, Y1, Z1] correspond to the room 301 of the third floor. Individual correspondence may represent a level of accuracy for identifying the real location of a caller. Initially, levels of accuracies of registered location information in the positioning system may not be great. As more tests and verifications are performed by technicians in accordance with the present disclosure, the levels of accuracies of the registered information can be improved.

As used herein, "ground truth location information" refers to location information that has a sufficient level of accuracy for a responder of a call center to ascertain the location of the call and dispatch help. The sufficiency of the level of accuracy may be determined according to pre-established standards or rules imposed by regulatory agencies.

It should be understood that various technical solutions provided herein are not limited to communications associated with emergency calls, but can also be applied in other contexts such as communication associated with non-emergency calls.

Example Systems and Devices

FIG. 1 is a schematic block diagram illustrating a communication system 100 for communicating the location information regarding a user device (UD) to a call center. The communication system 100 includes a UD 105 and components of a 5G network comprising a Radio Access Network (RAN) 112, which includes base stations (BSs) sometimes referred to as New Radio (NR) NodeBs or gNBs (collectively and generically referred to herein as gNBs), a home network 150 that is subscribed to by the UD 105 or provides network service to the UD 105, a call center 130 in communication with the home network 150.

The home network 150 further includes a Session Management Function (SMF) 151, a Location Management Function (LMF) 152, a Policy Control Function (PCF) 153, an Access and Mobility Management Function (AMF) 154, a Gateway Mobile Location Center (GMLC) 155, a Unified Data Management (UDM) 156, a User Plane Function (UPF) 157, and an IP Multimedia Subsystem (IMS) 160 that includes a Proxy Call Session Control Function (P-CSCF) 161, a corresponding Serving CSCF (S-CSCF) and/or Emergency Call Session Control Function (E-CSCF) 162, and an Interconnect Session Border Controller (I-SBC) 163.

The home network 150 here may be a 5G network (also referred to as a New Radio (NR) network). The RAN 112 may be referred to as an NR RAN or a 5G RAN; and the home network 150 may be referred to as a Next Generation (NG) Core network (NGC). The communication system 100 may include additional or alternative components. It should be noted that, however, the home network 150 used herein may not be limited to a 5G network, and other networks such as Second Generation (2G) Global System for Mobile Communications (GSM), Third Generation (3G) Universal Mobile Telecommunications System (UMTS) or Fourth Generation (4G) Long Term Evolution (LTE).

It should be noted that FIG. 1 provides only a generalized illustration of various components, any or all of which may be utilized as appropriate, and each of which may be duplicated or omitted as necessary. Specifically, although only one UD 105 is illustrated, it will be understood that many UDs (e.g., hundreds, thousands, millions, etc.) may utilize the communication system 100. The illustrated connections that connect the various components in the communication system 100 include data (medium) and signaling connections which may include additional (intermediary) components, direct or indirect physical and/or wireless connections, and/or additional networks. Furthermore, components may be rearranged, combined, separated, substituted, and/or omitted, depending on desired functionality. While FIG. 1 illustrates a 5G-based network, similar network implementations and configurations may be used for other communication technologies, such as 3G, Long Term Evolution (LTE), 802.11 WiFi, etc.

The UD 105, as used herein, may be any electronic device and may be referred to as a user equipment, a mobile device, a wireless device, a mobile terminal, a terminal, a mobile station (MS), a Secure User Plane Location (SUPL) Enabled Terminal (SET), or by some other name. It should be noted that the user device (UD) is used interchangeably with user equipment (UE). Moreover, UD 105 may correspond to a smart watch, digital glasses, fitness monitor, smart car, smart appliance, cellphone, smartphone, laptop, tablet, PDA, tracking device, control device or some other portable or moveable device. The UD 105 may include a single entity or may include multiple entities such as in a personal area network where a user may employ audio, video and/or data I/O devices and/or body sensors and a separate wireline or wireless modem. Typically, though not necessarily, the UD 105 may support wireless communication using one or more Radio Access Technologies (RATs) such as 5G new radio (NR) (e.g., using the RAN 112 and home network 150), etc. The UD 105 may also support wireless communication using a Wireless Local Area Network (WLAN) which may connect to other networks (e.g., the Internet) using a Digital Subscriber Line (DSL) or packet cable for example. The UD 105 may communicate with the call center 130 (e.g., via various elements of the home network 150 and/or possibly via a Gateway Mobile Location Center (GMLC) 155) and allow the call center 130 to receive location information regarding the UD 105.

The UD 105 may enter a connected state with a wireless communication network that may include the RAN 112. In one example, the UD 105 may communicate with a cellular communication network by transmitting wireless signals to, or receiving wireless signals from a cellular transceiver, in the RAN 112, such as a gNB included therein. A transceiver provides user and control planes protocol terminations toward the UD 105 and may be referred to as a base station, a base transceiver station, a radio base station, a radio transceiver, a radio network controller, a transceiver function, a base station subsystem (BSS), an extended service set (ESS), or by some other suitable terminology.

The UD 105 may have circuitry and processing resources capable of obtaining location related measurements. Location related measurements obtained by UD 105 may include measurements of signals received from satellites belonging to a Satellite Positioning System (SPS) or Global Navigation Satellite System (GNSS) and/or may include measurements of signals received from terrestrial transmitters fixed at known locations (e.g., such as gNBs included in the RAN 112). UD 105 or a separate location server (e.g., LMF 152), to which UD 105 may send the measurements, may then obtain a location data for the UD 105 based on these location related measurements. A UD 105 may transfer the location data and the location measurements to a location server, such as LMF 152, to determine a location for UD 105.

The gNBs included in the RAN 112 can communicate with the AMF 154, which, for positioning functionality, communicates with the LMF 152. The AMF 154 may support mobility of the UD 105, including cell change and handover and may participate in supporting a signaling connection to the UD 105 and possibly helping establish and release Protocol Data Unit (PDU) sessions for UD 105. Other functions of AMF 154 may include: termination of a control plane (CP) interface from RAN 112; termination of Non-Access Stratum (NAS) signaling connections from UDs such as UD 105, NAS ciphering and integrity protection; registration management; connection management; reachability management; mobility management; access authentication and authorization.

The SMF 151 connects to the AMF 154 and the UPF 157. The SMF 151 may have the capability to control a local and/or a central UPF within a PDU session. The SMF 141 may manage the establishment, modification and release of PDU sessions for UD 105, perform IP address allocation and management for UD 105, act as a Dynamic Host Configuration Protocol (DHCP) server for UE, and select and control a UPF on behalf of UD 105.

The UPF 157 may support voice and data bearers for UD 105 and may enable UD voice and data access to other networks such as the Internet. The UPF 157 may be connected to gNBs included in the RAN 112. UPF functions may include: external PDU session point of interconnect to a Data Network, packet (e.g. Internet Protocol (IP)) routing and forwarding, packet inspection and user plane part of policy rule enforcement, Quality of Service (QOS) handling for user plane, downlink packet buffering and downlink data notification triggering. UPF may be connected to a Secure User Plane Location (SUPL) Location Platform (SLP) to enable support of positioning of UD 105 using SUPL.

The PCF 153 uses the policy subscription information stored in the User Data Repository (UDR) to provide policy rules to network functions (e.g., SMF 151 and AMF 154). The PCF may use a standard interface to integrate with the AMF 154 for access and mobility policy, and with SMF 151 for session management policy.

The LMF 152 may support positioning of the UD 105 when UD 105 accesses the RAN 112 and may support position procedures/methods to obtain the accurate location/position information regarding the location/position of the UD 105. The LMF 152 may also process location services requests for the UD 105, e.g., received from the GMLC 155. In some embodiments, a node/system that implements the LMF 152 may additionally or alternatively implement other types of location-support modules, such as an Enhanced Serving Mobile Location Center (E-SMLC), a Secure User Plane Location (SUPL), or a Secure Location Platform (SLP). It will be noted that in some embodiments, at least part of the positioning functionality (including derivation of UD 105's location) may be performed at the UD 105 (e.g., using signal measurements for signals transmitted by wireless nodes, and assistance data provided to the UD 105). The LMF 152 may be referred to by other names such as a Location Manager (LM), Location Function (LF), commercial LMF (CLMF) or value added LMF (VLMF).

The GMLC 155 may support a location service request for the UD 105 received from the call center 130 and may forward such a location service request to the LMF 152. A location response from the LMF 152 (e.g., containing the location information for the UD 105) may be similarly returned to the GMLC 155 and the GMLC 155 may then return the location response (e.g., containing the location formation) to the call center 130. GMLC 155 may further initiate a location session for UD 105 by sending a location service request for UD 105 to LMF 152 and may include in the location service request an identity for UD 105 and the type of location being requested (e.g., such as a current location or a sequence of periodic or triggered locations). In contrast to a traditional CP location protocol, where a GMLC 155 may send a location service request for UD 105 to a serving AMF for UD 105 (e.g., AMF 154), GMLC 155 may only send a location service request for UD 105 to an LMF such as LMF 152. This may reduce impacts to AMFs (e.g., AMF 154) and may enable more efficient location of UD 105 as described below.

The GMLC 155 may be connected to a Location Retrieval Function (LRF), which may obtain the location of the UD 105 through interaction with UD 105, the gNB(s) included in the RAN 112, and/or computes the geolocation using suitable positioning methods such as signal triangulation techniques. The LRF may directly send the location information to the call center 130 or pass the location information to the IMS 160 for routing to the call center 130.

As further illustrated in FIG. 1, the LMF 152 and the RAN 112 may communicate using an appropriate position protocol (e.g., a New Radio Position Protocol A defined in 3GPP Technical Specification (TS) 36.455), with messages being transferred between the RAN and the LMF 152 via the AMF 154. The position protocol may be used to support positioning of UD 105 using UD assisted and/or UD based position methods. For example, the position protocol may be used to support positioning of UD 105 using network-based position methods such as Enhanced Call ID (ECID), when used with measurements obtained by a gNB included in the RAN 112. In some embodiments, the position protocol may be used by LMF 152 to obtain location related information from multiple gNBs included in the RAN 112 such as parameters defining positioning reference signal (PRS) transmission.

It is noted that the LMF 152 and the GMLC 155 may be constituents of a positioning system 170. The positioning system 170 may further include a location database that stores the various location information received from the UD, updated location information received from the UD, and derivative location information generated by the GMLC 155, LMF 152. The derivative location information may be obtained by processing the location information (e.g., GPS signal) or updated information received from the UD. The derivative location may also include the registered location information that is registered on a database (e.g., the database of the positioning system 170 or the database 235 of the call center simulator 230) corresponding to the location information. The derivative location information may also include ground truth location information corresponding to the location information received from the UD. The ground truth location information may include a real-world identifier that can be readily appreciated by the dispatcher or the call center to accurately and precisely identify the location of the UD (e.g., the exact floor with an ascertained floor number or an exact room with an ascertained room number in a complex building). It is noted that the various location information may have different level of accuracy. The positioning system 170 may further comprise a comparison module (not shown) configured to compare the accuracy of location information, and determine whether the registered location information is sufficient accurate based on the comparison. In addition, the positioning system 170 may be configured to update the database thereof to register the updated location information with higher level of accuracy, based on the results of comparison.

As illustrated in FIG. 1, the UDM 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UD 105 and may perform the following functions: UD authentication, UD identification, access authorization, registration and mobility management, subscription management and Short Message Service management. Additionally, the GMLC 155 may be connected to the LRF, which handles retrieval of location information for the UD 105 and may be used to provide location information for UD 105 to the call center 130 following an emergency call from UD 105 to the call center 130.

The IMS 160 is connected to the PCF 153, the UPF 157, and the call center 130. The IMS 160 may be used for establishing and releasing voice calls, data sessions and/or emergency calls which may be originated by or terminated to UD 105 using the IETF Session Initiation Protocol (SIP). As mentioned above, the IMS 160 may include a P-CSCF 161, an S-CSCF 162, a corresponding S-CSCF and/or E-CSCF 162, and an I-SBC 163, which are possibly as described in 3GPP TS 23.228.

The P-CSCF 161 can represent functionality of a proxy server that receives data from the UD 105. The P-CSCF 161 may route incoming SIP messages of incoming voice calls from the UD 105 to S-CSCF/E-CSCF 162. The P-CSCF 161 may handle Internet Protocol Security (IPSec) for communications that are exchanged by the wireless user devices. The P-CSCF 161 may also handle Remote Authentication Dial-In User Service (RADIUS) sessions. The corresponding S-CSCF 162 may communicate with a telephony application server (TAS) that resides in the home network 150. The TAS may route voice and/or data communications within the home network 150 and with other networks, including public switch telephone networks (PSTNs). The E-CSCF 162 can implement functionality to configure the message for sending between the call center 130 and the IMS 160 for delivery to the emergency service center. The E-CSCF 162 may send a request to the call center 130, send a location query to the GMLC 155, and/or send a request for a protocol conversion to the call center 130 (or a third-party partner that provides protocol conversion services/values). The E-CSCF 162 may also receive location data and/or protocol data (e.g., a protocol, a protocol conversion value, etc.) from the GMLC 155.

The I-SBC 163 may serve as a connection point between the IMS 160 and the call center 130. The I-SBC 163 may provide SIP normalization and Topology Hiding and Internetwork Gateway (THIG) services. In some embodiments, the I-SBC 163 include transcoding unit(s) configured to performing transcoding of the media stream when different codecs are in use. The I-SBC 163 may also provide protocol normalization and header manipulation, enabling communication between different networks.

The call center 130 may be a service provider that operates in response to the emergency call. Examples of the call center includes but are not limited to: a PSAP capable of receiving and processing emergency calls from all voice communications service providers, a security service provider such as OnStar or ADT, a service monitoring agency, a senior care provider, and so on. In some embodiments, the call center 130 includes a location database. The location database may be an Automatic Location Identification (ALI) database 135. For example, the ALI database 135 may be connected to the PSAP included in the call center 130. The ALI database 135 is a secure database that contains the exact emergency address for given associated phone numbers. This database is queried by the PSAP at the time of an emergency call to obtain the caller's location. For example, if a caller dials an emergency phone number, then the ALI database 135 will be able to provide first responders with a location instantly in order to cut down on response time. By allowing phone numbers and/or the location information transmitted from the GMLC 155 to be saved in the ALI database 135, emergency situations are allowed to be addressed faster and with more accuracy.

As mentioned above, UD 105 may be able to initiate voice, text, video, or other data emergency calls. The IMS 160 can deliver these voice, text, video, and data emergency calls to the call center 130, which may be, for example, an emergency call center. The signaling protocol used for delivering these emergency calls may be the Session Initiation Protocol (SIP) defined by the Internet Engineering Task Force (IETF). In operation, the UD 105 may initiate an emergency call request. The emergency call request is for establishing an emergency call with an appropriate call center 130, and for delivery of location information associated with the UD 105 to the call center 130. The location information may be acquired via one or more procedures described above. The UD 105 may send a SIP message with an emergency indication to the UPF 157, and the SIP message may be further routed to the IMS 160 and received by the P-CSCF 161. The SIP message may include, among other information, a SIP header that conveys information carried by the SIP message.

The information carried by a header included in the SIP message includes location information regarding a current location of the UD 105 at the time the SIP message is sent to the home network 150. The current location of the UD 105 may be obtained by various methods described above (i.e., SPS, GNSS, or GPS). In some embodiments, the location information may also include static information and dynamic location information about the UD 105. The static location information may include the longitudinal and latitudinal coordinates of the UD 105, positional data (i.e., geographic coordinates [X, Y, Z]) of the UD 105, relevant position of the UD 105 to a reference location (e.g., a nearby landmark, building, street, cross-road, etc.). The dynamic location information may include the moving speed of the UD 105, the moving direction of the UD 105, the route of the UD 105, the predicted position of the UD 105 at a future time point estimated by the speed, moving direction, and/or the route of the UD 105, and so on. A combination of the static location information and the dynamic location information may provide accurate location of the UD to the call center in a timely manner. The information carried by the SIP message may further include other emergency-related information such as timing, UD identification, caller identity associated with the UD 105, UD subscription information, caller account information, and so on.

In some embodiments, the UD 105 is configured to periodically send SIP messages to the home network 150 once an emergency call is initiated. Each SIP message contains location information regarding the current location of the UD 105 at the time the SIP message is sent to the home network. In this way, the call center may receive a timely update of the location information regarding the UD 105. In some embodiments, the UD 105 may be configured to periodically send a SIP message at a frequency. For example, the frequency may be once per 30 milliseconds; however, lower or higher frequencies are also possible in alternative embodiments.

The UD 105 may initiate an emergency call at a first location (i.e., Location 1), which may be routed to the call center 130 by the home network 150 through one of more gNBs included in the RAN 112. As discussed above, the signaling protocol and signaling path used for the routing information of Location 1 may be based on a SIP signaling, which includes receiving and sending SIP messages through the UPF 157, PCF 153, and IMS 160, and possible other elements in the home network 150. At some later time, UD 105 may move from the first location to a second location (i.e., Location 2). At the second location, the wireless signal coverage and strength may not change as compared with the first location (i.e., both Location 1 and Location 2 are within the coverage of the RAN 112). The emergency call initiated by the UD 105 at the first location may continue without undergoing a roaming process. The UD 105 may send SIP messages containing information regarding Location 2 to the home network 150, without changing the signaling protocol and path.

Figure 2:
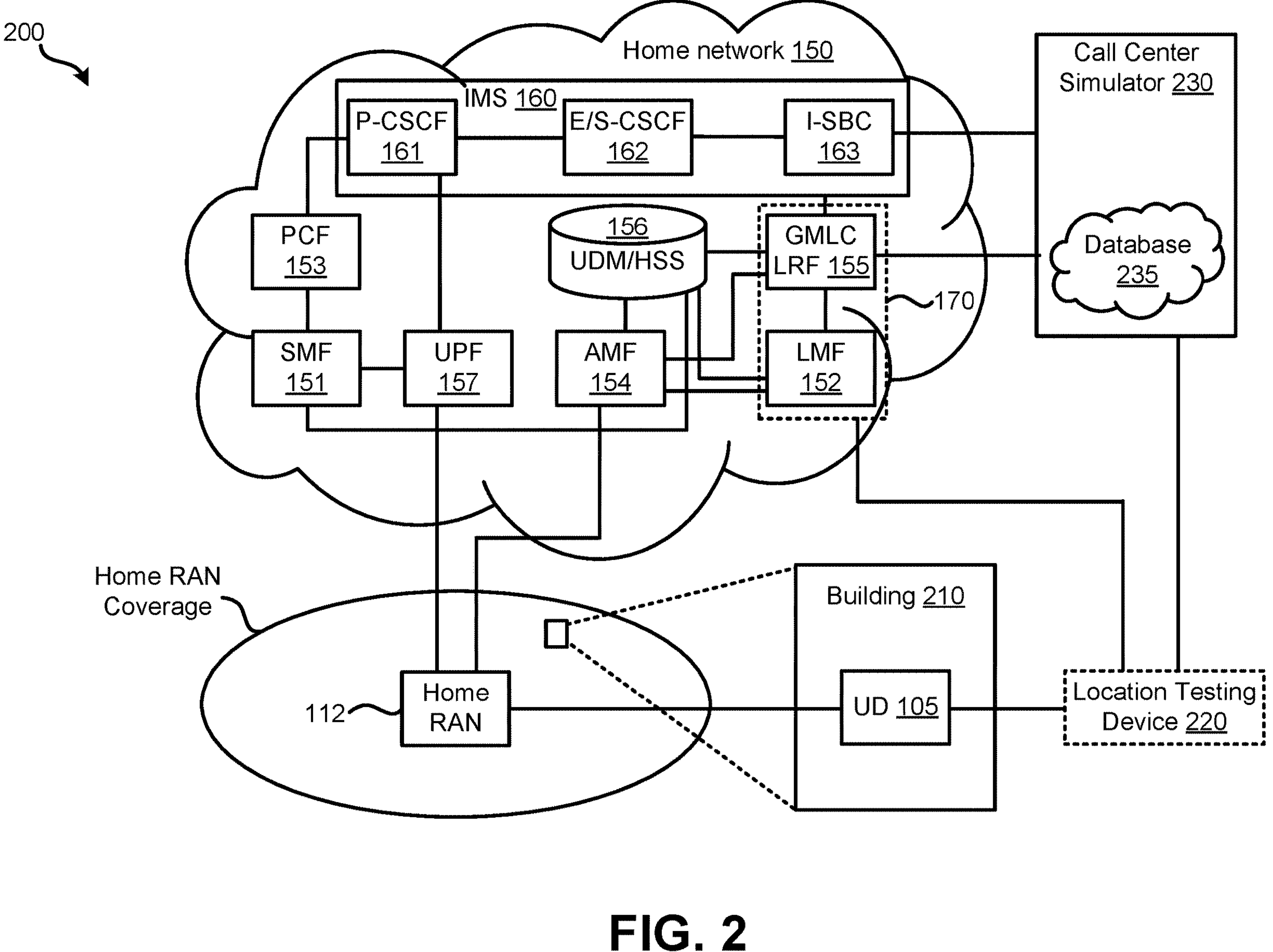
FIG. 2 is a schematic block diagram illustrating a communication system for testing location information regarding a user device, according to various embodiments.

FIG. 2 is a schematic block diagram illustrating a communication system 200 for communicating location information regarding a UD. The communication system 200 can be a test call system used to test the accuracy of location information in a simulated arrangement of emergency call communications. In the illustrated example, the communication system 200 includes the home RAN 112 and the home network 150 (shown in FIG. 1), which is subscribed to by or provides service to the UD 105. The communication system 200 further includes a call center simulator 230 and a location testing system or device 220, and a UD 105 at a location within the home RAN coverage of the home RAN 112. The location of the UD 105 may be in a building 210. The home network 150 is in communication with the home RAN 112. The positioning system 170 of the home network 150, the call center simulator 230, the location testing device 220, and the UD 105 are communicatively interconnected.

The caller of the UD 105 may initiate a testing call by dial a test number (e.g., 5-1-1, 9-2-2, or other number different from 9-1-1) from the UD 105 in a location of a test area within the coverage of the home RAN 112 to test the accuracy of the location information regarding the location where the communication from UD is initiated. The test area may be dense urban, urban, suburban, and rural morphologies of a metropolitan area. The location may be in a residential or commercial building or construction, which may have multiple internal rooms and/or a relatively complex infrastructure.

The UD 105 can access the home network 150 via the home RAN 112 and transmit signaling and media content to the call center simulator 230 through the signaling path described above. The signaling may include a SIP message that includes a SIP header, a SIP OPTIONS, and/or a SIP UPDATE. The SIP header may include location information regarding the location, measurements of signals received from any possible geographic information systems such as GNSS and GPS, and/or measurements of signals received from terrestrial transmitters fixed at known locations (e.g., such as gNBs included in the RAN 112). For the purpose of testing, the caller may be a technician or a requestor.

As described above, the positioning system 170 is configured to receive and process location information and updated location information regarding the UD received from the caller and/or the UD 105 of the caller. The location information can be obtained by extraction from the communications initiated from the caller. For example, the location information may be extracted from a SIP header of a SIP message included in the communication initiated from the UD 105 and forwarded to the call center simulator 230. The positioning system 170 can process the location information and/or the location-related measurements provided by the UD 105, and generate derivative location information based on the location information. Alternatively, the positioning system 170 can locate registered location information stored in a database, based on the location information. The positioning system 170 can determine the accuracy of the location information, derivative location information, and registered location information. The registered location information may include the ground truth location information regarding the location of the UD. The positioning system 170 can further update the database with the location information with a higher level of accuracy (e.g., the ground truth location information) and/or register the ground truth location information in the database.

The call center simulator 230 is similar to the call center 130 of FIG. 1. The call center simulator 230 may simulate the call center 130 and can prevent other external customers from attaching to the home RAN 112 during testing, test calls will be placed with the access points of the home RAN 112 in a reserve mode (restricted testing mode) without interference from normal users accessing the RAN 112. The test calls may be initiated by the UD 105 in the location using whitelisted phone numbers by dialing 5-2-2 or 9-2-2 as a proxy for 9-1-1. Test calls are routed to the call center simulator, which will block test calls from being delivered to a real-world call center (e.g., PSAP). The call center simulator 230 may further include a database 235 that can store registered location information and/or the ground truth location information.

The location testing device 220 is configured to receive various location information from the positioning system 170 associated with the communications in a test call of a field test for location information and determine the accuracy level of the received location information. The location testing device 220 may compare accuracy level of location information and updated location information regarding the location of the UD, and determine if an update of the registered location information is needed based on the comparison. The location testing device 220 may be carried and operated by the technician (i.e., the caller using the UD) during test call communications. In alternative embodiments, the location testing device 220 may be internal component of the positioning system 170 or integrated thereto.

Example Methods

Figure 3:
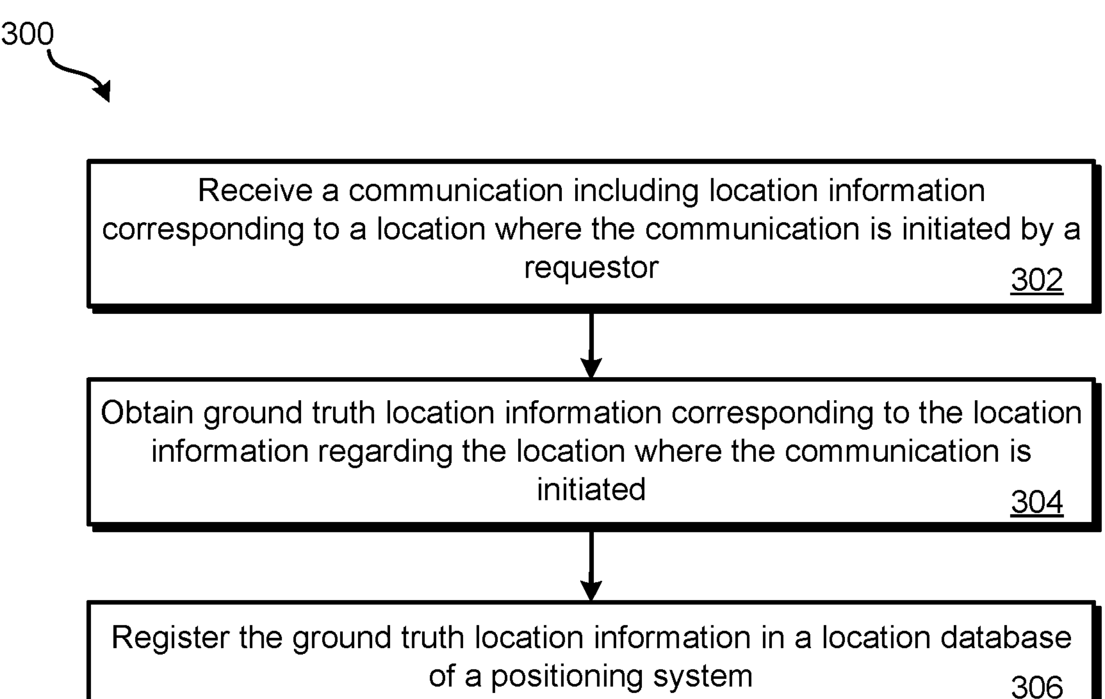
FIG. 3 is a flow diagram illustrating an example method for communicating location information regarding a user device, according to various embodiments.

FIG. 3 is a flow diagram illustrating an example method 300 for communication of location information, according to various embodiments. The method may be implemented by a communication system described herein. It can be noted that, as with figures appended hereto, FIG. 3 is provided as a non-limiting example. Other embodiments may vary, depending on desired functionality. Means for performing the functionality of method 300 may include hardware and/or software means of a computer device or computer system, such any of devices described in FIG. 7.

At 302, communications including location information corresponding to locations where the communications are initiated by a requestor are received by a positioning system as described herein. In one example, a simulated emergency call (i.e., a test call) can be established by a requestor such as a technician who is dispatched to an actual site within the coverage of the cellular network. The actual site may be a building or a complex. The simulated emergency call may be initiated by the technician in a given location from a UD operated by the technician. The ground truth location information of the given location may be readily ascertainable by the technician (e.g., the room number of the building or the complex). The simulated emergency call may initiate a communication between the UD and a simulated call center about location information regarding the UD. The communication may be received by a positioning system. The communication may include location information regarding the location. For example, the location information can be extracted from a SIP message or a SIP header thereof and received by the positioning system. In some embodiments, the location information includes a set of coordinates indicating a [X, Y, Z] location where the communication is initiated.

The set of coordinates indicating a [X, Y, Z] location may be obtained using various positioning technologies. In some embodiments, the X and Y coordinates (i.e., the horizontal location) may be obtained by GPS or assisted GPS. The Y coordinate represents the height of the location relative to the ground and may be obtained by assisted GPS or a combination of GPS and height positioning techniques such as barometric pressure sensor. However, different positioning technologies can have different levels of accuracy. For example, certain assisted GPS may only be able to provide location information accurately within 50 meters apart from each other. Accordingly, the location information generated by GPS may not have a sufficient accuracy level for a dispatcher to ascertain the real-earth location where the communication is initiated, particularly when the location is in a multi-story or multi-compartment complex building.

At 304, the test call is routed to a positioning system having a location database. The location database is configured to register location information corresponding to the location information generated by and received from the UD, and store the registered location information. A request may be sent to the requestor to request the ground truth location information corresponding to the location information regarding the location where the communication is initiated. The ground truth location information is obtained and verified, by the requestor, in response to the request. The ground truth location information may include a real-world location identifier. The real-world location identifier may be a street name, a street number, a room number, an indicator identifying an area within a structure, a cubicle number, or any combinations thereof. The ground truth location information may have different levels of accuracy. In one example, the location is a room in a floor of a multi-floor building, and the ground truth location information may be the floor number of the room. In another example, the ground truth location information may be the floor number and the room number of the room. In yet another number, the ground truth location information may be a combination of the floor number, the room number, and the cubicle number of the location within the room (e.g., if the room has a very large dimension).

At 306, the ground truth location information is transmitted to the positioning system. The ground truth location information may be correlated or corresponded to the location information received from by the requestor positioning system. The ground truth location information may be further registered and stored in the location database as record for future use. For example, if a real-world emergency call is initiated from the same location in the future, the positioning system can retrieve the ground truth location information corresponding to the location information regarding the location. The ground truth location information having a sufficient level of accuracy can be reported to the responder of the call center and used to ascertain the location of the caller who initiated the real-world emergency call in the building with improved accuracy.

Figure 4:
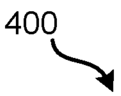
FIG. 4 is a flow diagram illustrating another example method for communicating location information regarding a user device, according to various embodiments.
Figure 4:
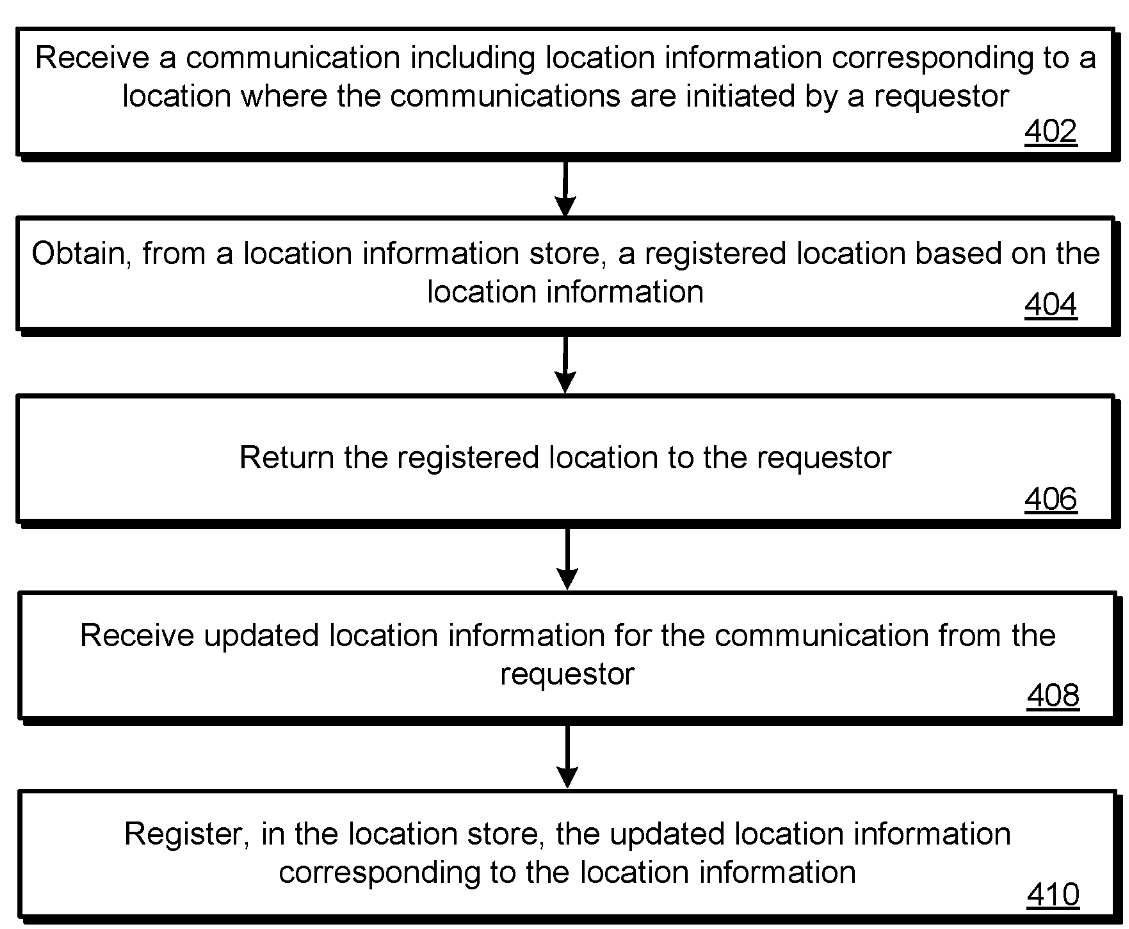

FIG. 4 is a flow diagram illustrating an example method 400 for communication of location information, according to various embodiments. The method may be implemented by a communication system described herein. It can be noted that, as with figures appended hereto, FIG. 4 is provided as a non-limiting example. Other embodiments may vary, depending on desired functionality.

At 402, a communication including location information corresponding to a location where the communication is initiated by a requestor by a test call are received by a positioning system as described herein, in a similar manner as 302 of the method 300.

At 404, the test call is routed to a positioning system having a location database that stores registered locations regarding various different sites. Registered location information regarding the location is obtained from the location database of the positioning system. The registered location information may be generated or established previously, for example, using the method 300. The registered location information regarding the location may have a first level of accuracy. As described above, the registered location information may correspond to the ground truth location of the location. In some embodiments, the registered location information may have a sufficient level of accuracy for the responder of the call center to ascertain the real-world location where the test call is initiated. In other embodiments, the registered location information may not be sufficiently precise and accurate for the responder to ascertain the real-world location where the test call is initiated.

At 406, the registered location information is returned to the UD and received by the requestor who initiated the test call and the communication. A request may be sent to the requestor to request updated location information regarding the location where the test call and the communication are initiated. The updated location information is obtained and verified, by the requestor, in response to the request. The updated location information may be ground truth location information regarding the location and has a second level of accuracy.

At 410, the updated location information corresponding to the location information may be stored in the location database to replace the registered location information, based on the determination of the sufficiency at 408. For example, if the updated location information is determined to be sufficient or satisfy the requirement imposed by FCC, the database is updated to store the updated information to replace the previously registered location information.

Figure 5:
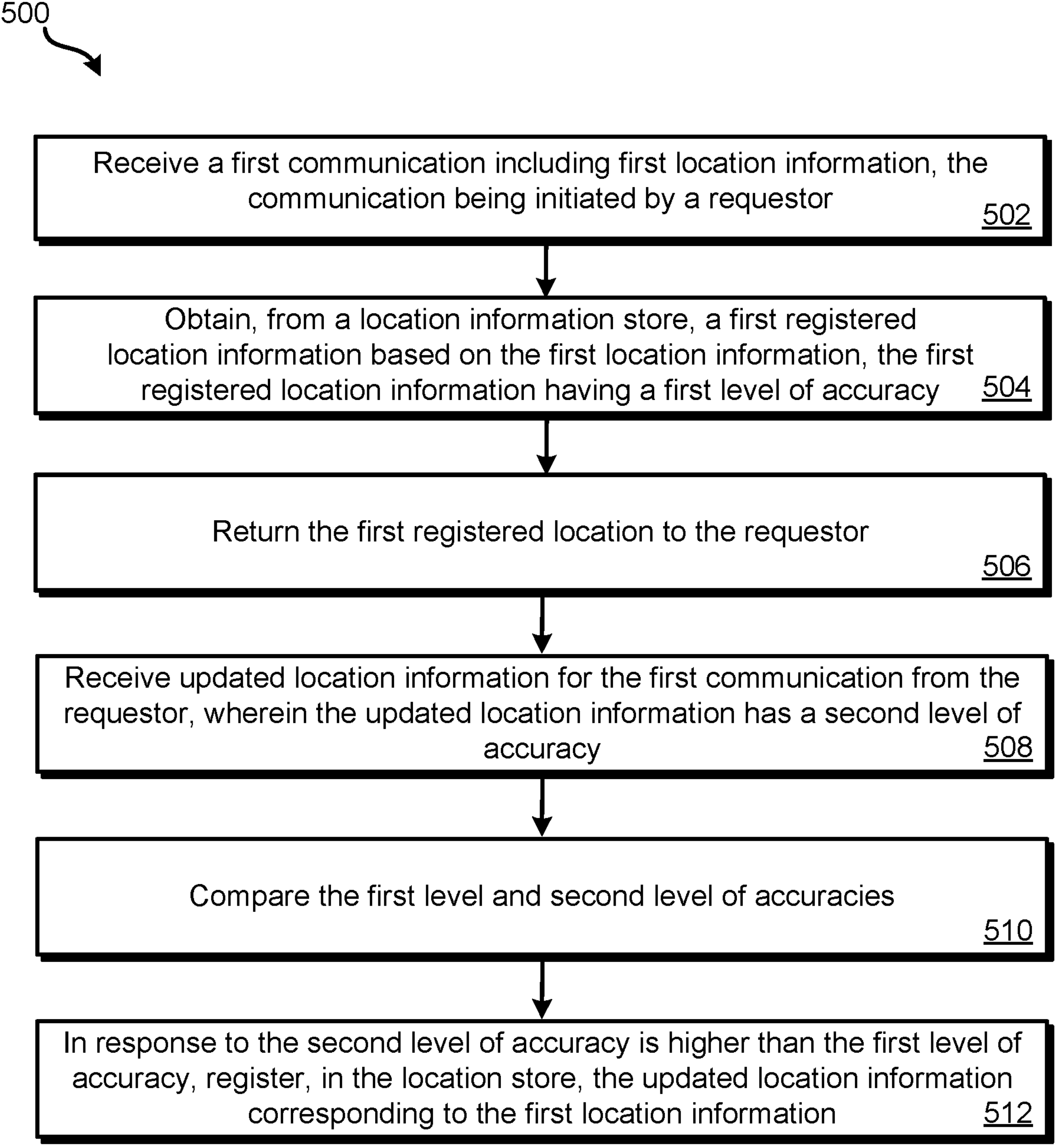
FIG. 5 is a schematic diagram illustrating an example of computer system or computer device, according to various embodiments.

FIG. 5 is a flow diagram illustrating an example method 500 for communication of location information, according to various embodiments. The method 500 is a close variation of the method 400 and may be implemented by a communication system described herein. It can be noted that, as with figures appended hereto, FIG. 5 is provided as a non-limiting example. Other embodiments may vary, depending on desired functionality.

At 502, a first communication including first location information regarding a location is received. The first communication is established by a test call initiated by a requestor at the location.

At 504, the first registered location information based on the first location information is obtained. The test call is routed to the positioning system, and the first registered location information corresponding to the location information is identified and retrieved from a location information store where the first registered location information is stored. The registered location information has a first level of accuracy.

At 506, the first registered location information is returned to the requestor. A request for updated location information may be sent to the requestor along with the first registered location information. At 508, upon receipt of the request, the updated location information is obtained by the requestor and sent to and received by the positioning system. The updated location information has a second level of accuracy.

At 508, the registered location information retrieved from the location database is compared with the updated location information by the positioning system with respect to the level of accuracy. In other words, the second level of accuracy is compared with the first level of accuracy.

At 510, in response to a determination that the second level of accuracy is higher than the first level of accuracy, the updated location information corresponding to the first location information is registered in the location database of the positioning system. In other words, the existing registered location information is replaced by updated location information if the second level of accuracy is higher than the first level of accuracy, indicating that the updated location information is more accurate and/or precise than the registered location information. As an example, the previously registered location information having the first level of accuracy may only include the floor number of the location in the building, and the updated location information having the second level of accuracy may include more detailed information such as the room number and cubicle number of the room within which the test call is initiated. In this way, the location database can be updated to provide more accurate location information to the responder of the call center in real-time emergency call communication.

Figure 6:
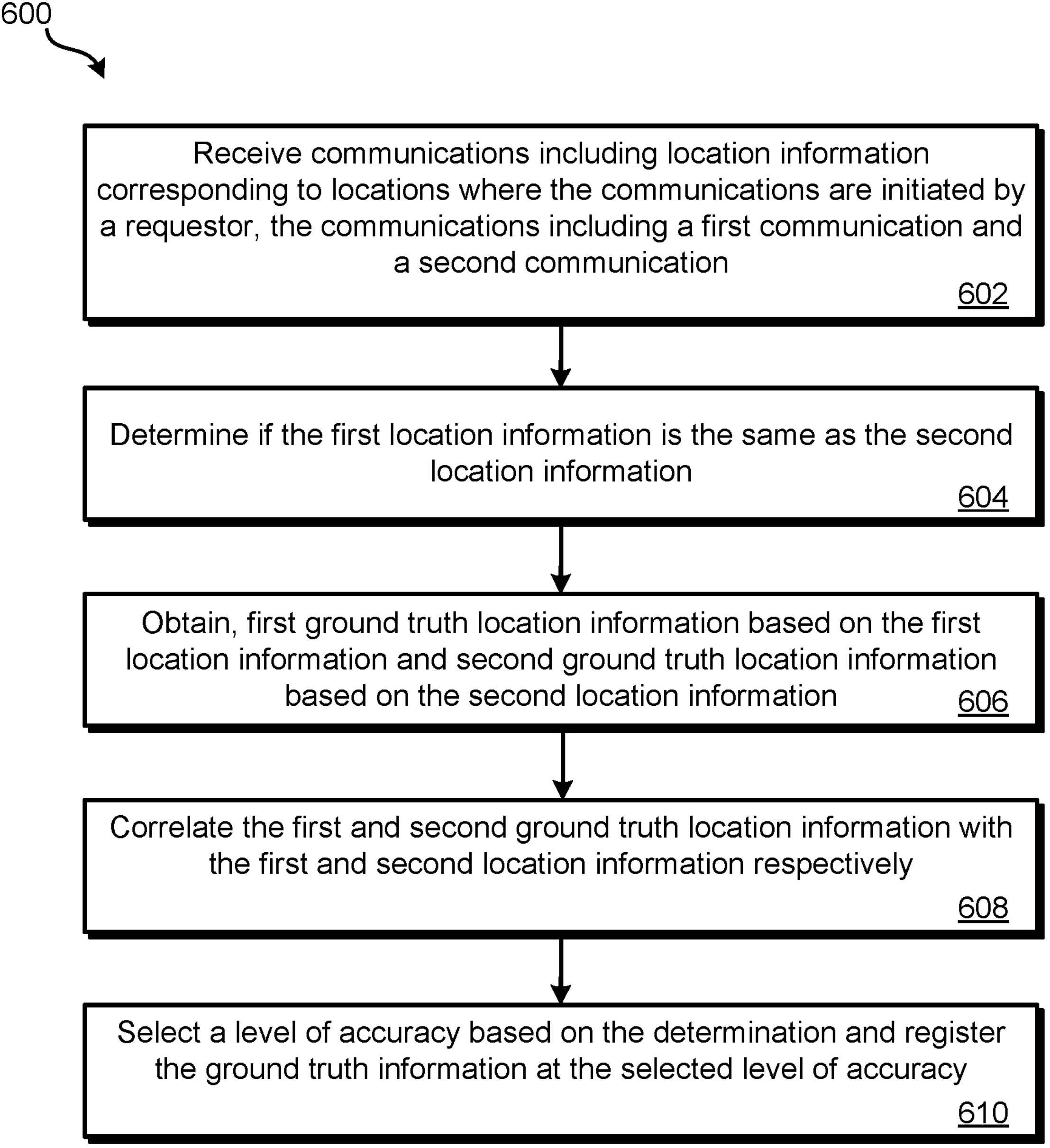
FIG. 6 is a schematic diagram illustrating an example of computer system or computer device, according to various embodiments.

FIG. 6 is a flow diagram illustrating an example method 600 for communication of location information, according to various embodiments. The method 600 is a close variation of the method 300 and may be implemented by a communication system described herein. It can be noted that, as with figures appended hereto, FIG. 6 is provided as a non-limiting example. Other embodiments may vary, depending on desired functionality.

At 602, communications are initiated by a requestor in a field test from one or more test calls in locations of a test area. The test area may be an actual site, for example, a multi-story complex building. The communications include location information corresponding to locations where the communications are initiated. In some embodiments, the communications include a first communication and a second communication. The first communication is from a first test call initiated at a first location of the test area, and the second communication is from a second test call initiated at a second location of the test area. For example, the first location may be a first room, and the second location may be a second room on the same floor (e.g., the first room is room 301 and the second room is room 302). In another example, the first location may be a first cubicle in a room, and the second location may be a second cubicle in the same room.

At 604, a determination is made on whether the first location information is the same as the second location information. Depending on the positioning technologies utilized to generate the location information (e.g., the resolution and quality of the GPS used by the user device), the first location information may be the same or different from the second location information, even if the first location and the second location are different. For example, the first location information from the first communication regarding the first location includes a first set of coordinates indicating a [X1, Y1, Z1] location, and the second location information from the second communication regarding the second location includes the same set of coordinates (i.e., indicating the [X1, Y1, Z1] location), even if the first location and the second location are different. As an exemplary illustration, the first location is in room 301 where the first test call is initiated, and the second location is in room 302 (or the same building as room 301) where the second test call is initiated. The first location information received from the first test call and the second location information received from the second test call may have the same set of coordinates [X1, Y1, Z1] despite that their real-world locations are different. If a positioning technique with higher resolution is used, the first location information may be differentiated from the second location information. For example, the first location information from the first communication regarding the first location includes a first set of coordinates indicating a [X1, Y1, Z1] location, and the second location information includes a second set of coordinates including a [X2, Y2, Z2] location.

At 606, first ground truth location information and second ground location information are obtained and verified by the requestor. The first ground truth location information is based on the first location information, and the second ground truth location information is based on the second location information. For example, the first ground truth location information includes the exact room number (e.g., 301) of the first location where the first test call is initiated, and the second ground truth location information includes the exact room number (e.g., 302) of the second location where the second test call is initiated.

At 608, the first and second ground truth location information with the first and second location information are respectively correlated. As a first example, the first location information (e.g., the first set of coordinates [X1, Y1, Z1]) may be correlated to the first ground truth location (e.g., room 301); and the second location information (e.g., the second set of coordinates [X1, Y1, Z1]) may be correlated to the second ground truth location (e.g., room 302). As a second example, if the first and the second location information could not be differentiated (e.g., both including the same set of coordinates [X1, Y1, Z1]), the first and the second location information could be still correlated to a more generic ground truth location information (e.g., the third floor that encompasses both room 301 and room 302). It should be noted that although the level of accuracy for the second example is not as high as the first example, it may nonetheless meet the minimum requirements for real-world practice.

At 610, a level of accuracy is selected based on the determination, and the ground truth information is registered on the location database of the positioning system based on the selected level of accuracy. In some embodiments, the sufficiency of the level of accuracy is verified according to pre-established requirements (e.g., a threshold standard used to ascertain the location for dispatching help, or a rule or regulation imposed by FCC). If the sufficiency is determined not to meet the requirements, a recommendation may be made to improve the resolution and/or accuracy of the positioning technology.

Example Computer System

Figure 7:
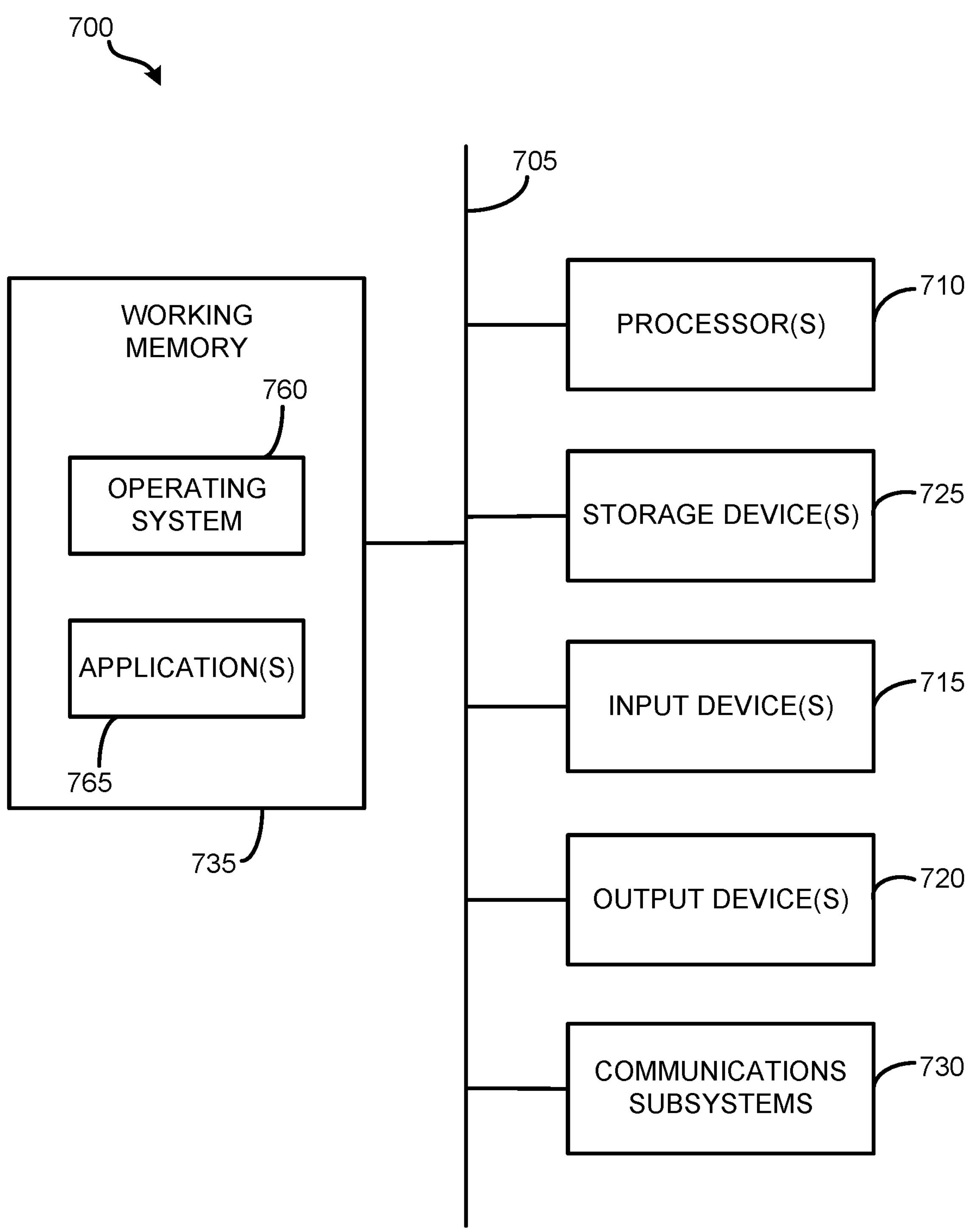
FIG. 7 is a schematic diagram illustrating an example of computer system or computer device, according to various embodiments.

FIG. 7 is a schematic diagram illustrating an example of computer system 700. The computer system 700 is a simplified computer system that can be used to implement various embodiments described and illustrated herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms “a”, “an”, and “the” include plural references unless the context clearly dictates otherwise. Thus, for example, reference to “a user” includes a plurality of such users, and reference to “the processor” includes reference to one or more processors and equivalents thereof known in the art, and so forth.

Also, the words “comprise”, “comprising”, “contains”, “containing”, “include”, “including”, and “includes”, when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A computer-implemented method, comprising:

receiving, by a call center simulator, test calls including location information corresponding to locations where the test calls are initiated by a requestor, wherein the test calls include a first communication including first location information having a first level of accuracy, and the call center simulator configured to block the test calls from being delivered to a real-world call center;

obtaining, by a location testing device and from a location information store, a first registered location based on the first location information, the location testing device being located at the first registered location;

returning, by the location testing device, the first registered location to the requestor;

receiving, by the location testing device, updated location information for the first communication from the requestor, wherein the updated location information has a second level of accuracy;

comparing, by the location testing device, the first level and second level of accuracy; and in response to the second level of accuracy is higher than the first level of accuracy, registering, in the location information store, the updated location information corresponding to the first location information.

2. The method of claim 1, wherein the first location information includes a set of coordinates indicating where the first communication is initiated.

3. The method of claim 2, wherein the set of coordinates indicates a location in a three-dimensional space.

4. The method of claim 1, wherein the communications include a second communication including second location information, wherein the second location information includes a set of coordinates indicating where the second communication is initiated, wherein the first and second location information indicates the same location.

5. The method of claim 1, wherein the updated location information includes ground truth location information corresponding to the first location information.

6. The method of claim 5, wherein the ground truth location information indicates a real-world identifier of the location ascertainable by the call center simulator receiving the first location information.

7. The method of claim 6, wherein the real-world identifier comprises: a street name, a street number, a floor number, a room number, or a cubicle number an indicator identifying an area within a structure.

8. A system comprising:

one or more processors; and a computer-readable storage media storing computer-executable instructions that, when executed by the one or more processors, cause the system to:

receive, by a call center simulator, test calls including location information corresponding to locations where the test calls are initiated by a requestor, wherein the test calls include a first communication including first location information having a first level of accuracy, and the call center simulator configured to block the test calls from being delivered to a real-world call center;

obtain, by a location testing device and from a location information store, a first registered location based on the first location information, the location testing device being located at the first registered location;

return, by the location testing device, the first registered location to the requestor;

receive, by the location testing device, updated location information for the first communication from the requestor, wherein the updated location information has a second level of accuracy;

compare, by the location testing device, the first level and second level of accuracy; and in response to the second level of accuracy is higher than the first level of accuracy, register, in the location information store, the updated location information corresponding to the first location information.

9. The system of claim 8, wherein the first location information includes a set of coordinates indicating where the first communication is initiated.

10. The system of claim 9, wherein the set of coordinates indicates a location in a three-dimensional space.

11. The system of claim 8, wherein the communications include a second communication including second location information, wherein the second location information includes a set of coordinates indicating where the second communication is initiated, wherein the first and second location information indicates the same location.

12. The system of claim 8, wherein the updated location information includes ground truth location information corresponding to the first location information.

13. The system of claim 12, wherein the ground truth location information indicates a real-world identifier of the location ascertainable by the call center simulator receiving the first location information.

14. The system of claim 13, wherein the real-world identifier comprises: a street name, a street number, a floor number, a room number, or a cubicle number an indicator identifying an area within a structure.

15. A non-transitory machine-readable storage medium encoded with instructions, the instructions executable to cause one or more processors of a computerized system to perform:

receiving, by a call center simulator, test calls including location information corresponding to locations where the test calls are initiated by a requestor, wherein the test calls include a first communication including first location information having a first level of accuracy, and the call center simulator configured to block the test calls from being delivered to a real-world call center;

obtaining, by a location testing device and from a location information store, a first registered location based on the first location information, the location testing device being located at the first registered location;

returning, by the location testing device, the first registered location to the requestor;

receiving, by the location testing device, updated location information for the first communication from the requestor, wherein the updated location information has a second level of accuracy;

comparing, by the location testing device, the first level and second level of accuracy; and in response to the second level of accuracy is higher than the first level of accuracy, registering, in the location information store, the updated location information corresponding to the first location information.

16. The non-transitory machine-readable storage medium of claim 15, wherein the first location information includes a set of coordinates indicating where the first communication is initiated.

17. The non-transitory machine-readable storage medium of claim 16, wherein the set of coordinates indicates a location in a three-dimensional space.

18. The non-transitory machine-readable storage medium of claim 15, wherein the communications include a second communication including second location information, wherein the second location information includes a set of coordinates indicating where the second communication is initiated, wherein the first and second location information indicates the same location.

19. The method of claim 1, wherein the location testing device is a mobile device separate from a user device.

* * * * *